Patented Apr. 20, 1948

2,439,905

UNITED STATES PATENT OFFICE 2,439,905

PROCESS OF PURIFYING LACTONES

Frank D. Pickel, Bogota, and Louis T. Rosenberg, Ridgefield Park, N. J., assignors to Nopco Chemical Company, Harrison, N. J., a corporation of New Jersey No Drawing. Application May 5, 1943, Serial No. 485,758

6 Claims. (Cl. 260—344)

This invention relates in general to the synthesis of lactones, and more particularly to the preparation of purified α-hydroxy-β,β-dimethyl-γ-butyrolactone.

With the discovery of the physiological activity of pantothenic acid and the subsequent determination of the chemical structure thereof, α-hydroxy-β,β-dimethyl-γ-butyrolactone has become a chemical of major importance. In the synthesis of pantothenic acid, α-hydroxy-β,β-dimethyl-γ-butyrolactone or the corresponding acid is condensed with β-alanine or a salt or ester thereof. α-hydroxy-β,β-dimethyl-γ-butyrolactone has been known for many years, as has the general process for producing the same. The preparation of this lactone is accomplished by condensing isobutyraldehyde with formaldehyde, in the presence of $K_2CO_3$ or the like, to form α,α-dimethyl-β-hydroxypropionaldehyde which is extracted from the reaction mass with a suitable solvent such as ether or, preferably, a halogenated hydrocarbon such as ethylene dichloride, methylene chloride, trichlorethylene, chloroform, carbon tetrachloride, or the like. The extracted aldehyde is then reacted with a bisulfite and the reaction product is converted to the cyanhydrin by means of a suitable cyanide. The cyanhydrin is then hydrolyzed to form an α-hydroxy-β,β-dimethyl-γ-butyrolactone which is then extracted from the reaction mass, after neutralization thereof, by means of a halogenated hydrocarbon solvent of the aforementioned type.

In synthesizing α-hydroxy-β,β-dimethyl-γ-butyrolactone according to the foregoing process, two undesirable by-products are formed as a result of the condensation of isobutyraldehyde and formaldehyde, i. e., α,α-dimethyl-β-hydroxypropionic acid and dimethyl propylene glycol. The α,α-dimethyl-β-hydroxypropionic acid is actually converted to its water-soluble potassium salt by means of the $K_2CO_3$ present during the condensation. On extraction of the mass with a halogenated hydrocarbon solvent, the dimethyl propylene glycol, which is soluble in the extracting solvent, is separated along with the α,α-dimethyl-β-propionaldehyde, the salt of α,α-dimethyl-β-hydroxypropionic acid remaining in the aqueous residue or raffinate. The dimethyl propylene glycol which is unaffected by the bisulfite, cyanide and hydrolysis treatments remains with and is recovered along with the α-hydroxy-β,β-dimethyl-γ-butyrolactone as an undesirable impurity. While this impurity is removed from the l-lactone in the well-known quinine resolute of the racemic mixture, the latter procedure cannot be resorted to at the present time. The present world conditions forbid the use of quinine for this purpose, hence the d-,l-lactone mixture must be used. While the pantothenic acid or salt thereof produced from the use of the d-,l-lactone mixture is only fifty per cent active, it is equally as valuable as the levorotatory product from a biological view, except that twice the quantity must be used. From a commercial standpoint, the elimination of the quinine resolution decreases considerably the cost of the ultimate product. The use of the racemic mixture has presented a problem due to its inclusion of dimethyl propylene glycol as an impurity which cannot be separated by conventional means such as distillation, crystallization or solvent extraction.

It is an object of this invention to provide a process of purifying the racemic mixture of α-hydroxy-β,β-dimethyl-γ-butyrolactone.

A specific object of the invention is to provide a commercially feasible process of separating dimethyl propylene glycol from the racemic mixture of α-hydroxy-β,β-dimethyl-γ-butyrolactone.

The invention accordingly comprises the several steps and the relation of one or more of such steps with respect to each of the others thereof, which will be exemplified in the process hereinafter disclosed, and the scope of the invention will be indicated in the claims.

According to the invention, the process comprises adding an alkaline agent to a mixture of α-hydroxy-β,β-dimethyl-γ-butyrolactone and dimethyl propylene glycol to convert the lactone to a salt of d,γ-dihydroxy-β,β-dimethyl butyric acid, adding a suitable solvent to precipitate the salt and separating the salt from the dimethyl propylene glycol-solvent mass. The salt thus recovered is then hydrolyzed to yield the purified lactone or purified racemic mixture thereof.

While the process of the present invention is applicable to the separation of any mixture of dimethyl propylene glycol and the specified lactone, it is particularly valuable in purifying the racemic mixture of lactones derived from the synthesis set forth hereinabove wherein isobutyraldehyde is condensed with formaldehyde, the resulting mass extracted with a halogenated hydrocarbon solvent, the extracted portion being treated with a bisulfite which product is then converted to a cyanhydrin which is subsequently hydrolyzed and extracted with a halogenated hydrocarbon solvent. This synthesis is described, apart from the particular extraction steps, by Stiller et al. in the Journal of the American Chemical Society, 62, pages 1785–1790 (1940).

The synthesis is further and completely disclosed in application for U. S. Letters Patent Serial No. 422,868, filed December 13, 1941.

The process of the invention may be used to purify racemic mixtures of d-,l-α-hydroxy-β,β-dimethyl-γ-butyrolactone wherein the racemic mixture is to be used in the production of d-,l-pantothenic acid or salts and esters thereof or wherein the purified racemic mixture of lactones is to be subsequently resolved by a compound wherein the d-lactone is precipitated as a salt rather than the l-lactone as in the quinine resolution.

In converting the lactone to a salt of the corresponding acid, any suitable alkaline agent may be employed, such as sodium, potassium, ammonium, etc., hydroxide or carbonate. Preferably the alkaline agent is employed as a concentrated aqueous solution. After the water-soluble salt of the α,γ-dihydroxy-β,β-dimethyl butyric acid has been formed, a water-miscible solvent, which is a non-solvent for said salt, is added to the mass which is then preferably heated or refluxed and permitted to cool. On cooling, the salt precipitates or crystallizes out leaving the dimethyl propylene glycol in the solvent phase. Appropriate solvents in which the salt is insoluble include isopropanol, propanol, butanol, isobutanol, and the like. Isopropanol functions exceedingly well and the use of this solvent is therefore highly preferred. After the salt of the α,γ-dihydroxy-β,β-dimethyl butyric acid has been precipitated or crystallized out it is removed and washed with a non-solvent therefor which is miscible with dimethyl propylene glycol, such as a halogenated hydrocarbon of the aforementioned type.

The purified mixture is now hydrolyzed to produce the purified racemic mixture of d-,l-α-hydroxy-β,β-dimethyl-γ-butyrolactone. Any suitable acid, such as hydrochloric acid or the like, may be employed to effect the desired hydrolysis. Hydrolysis is preferably accelerated by means of heat. After the mass has been permitted to cool, it is extracted with a halogenated hydrocarbon solvent. Prior to this extraction step it is preferable to neutralize the mass to a pH of about 6.0 to 7.1. This latter step is not necessary in all cases but it is desirable when the extraction step is to be carried out in metal equipment.

For a fuller understanding of the nature and objects of the invention, reference should be had to the following examples which are given merely to further illustrate the invention and are not to be construed in a limiting sense, all parts given being by weight.

Example I

To 140 parts of a crude racemic mixture of α-hydroxy-β,β-dimethyl-γ-butyrolactone, as produced according to the foregoing synthesis, there were added 84 parts of 50% aqueous NaOH. The mixture was heated for one-half hour and, while still hot, 250 parts of 99% isopropanol were added and the mass refluxed for one hour. The mass was allowed to cool and stand overnight whereupon the sodium salt of α,γ-dihydroxy-β,β-dimethyl butyric acid was filtered off, washed with ethylene dichloride and dried to yield 157.8 parts. 37.4 parts of the dry sodium salt were dissolved in 38 parts of 6NHCl (pH of the solution 0.9) and heated for one-half hour. After cooling, the mass was neutralized with a saturated solution of K₂CO₃ to a pH within the range of 6.0 to 7.0. The resulting solution was then extracted with two 100 part portions of methylene chloride. The methylene chloride extracted portions were combined and the methylene chloride distilled off whereby 25.5 parts of 99.7% pure d-,l-α-hydroxy-β,β-dimethyl-γ-butyrolactone were recovered.

Example II

To 50 parts of crude d-,l-α-hydroxy-β,β-dimethyl-γ-butyrolactone (containing 91% of the racemic mixture) there were added 30 parts of 50% aqueous NaOH and the mass heated on a steam bath for 45 minutes. While still hot, 60 parts of butanol were added to the mass to give a clear solution. The solution was stored in a refrigerator overnight and the precipitated salt of α,γ-dihydroxy-β,β-dimethyl butyric acid was then removed by filtration and washed with butanol and ether. The yield of dry salt was 57 parts. To 25 parts of this salt there were added 25 parts of 6NHCl, and the mass, thus having a pH of 1.5, was heated on a steam bath for one-half hour. The mass was then cooled to 20° C. and the pH adjusted to 7.1 by the addition of a saturated solution of K₂CO₃. The mass was then extracted with three 100 part portions of methylene chloride. The three extractions were combined and the solvent removed. The purified lactone was then distilled under vacuum. The yield was 40 parts of 100% pure lactone.

Either before or after carrying out the process of the invention, it is preferable to subject the racemic lactone mixture to distillation under reduced pressure to free the same of impurities of the type which may be thus eliminated. Various impurities such as tars and resins are formed during the synthesis of the lactone which should be removed prior to the step of condensing the lactone with β-alanine, its salts or esters in the production of pantothenic acid, its salts or esters.

From the foregoing it may be seen that a simple commmercially practicable process for purifying α-hydroxy-β,β-dimethyl-γ-butyrolacetone has been made available. The purified product is recovered in its crystalline form which is highly desirable as well as indicative of the purity of the end product.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. A process for separating dimethyl propylene glycol from racemic α-hydroxy-β,β-dimethyl-γ-butyrolactone, which comprises treating a mixture thereof with an aqueous alkali metal agent to convert the lactone to an alkali metal water-soluble salt of α-γ-dihydroxy-β,β-dimethyl butyric acid, adding a monohydric alcohol containing 3 to 4 carbon atoms to precipitate the butyric acid salt and removing said salt from the dimethyl propylene glycol.

2. A process for separating dimethyl propylene glycol from racemic α-hydroxy-β,β-dimethyl-γ-butyrolactone, which comprises treating a mixture thereof with an aqueous alkali metal agent to convert the lactone to an alkali metal salt of α, γ-dihydroxy β,β-dimethyl butyric acid, adding isopropanol to precipitate the butyric acid salt and removing said salt from the dimethyl propylene glycol.

3. A process for separating dimethyl propylene glycol from racemic α-hydroxy-β,β-dimethyl-γ-butyrolactone, which comprises treating a mixture thereof with an aqueous alkali metal agent to convert the lactone to an alkali metal salt of α,γ-dihydroxy-β,β-dimethyl butyric acid, adding normal propanol to precipitate the butyric acid salt and removing said salt from the dimethyl propylene glycol.

4. A process for separating dimethyl propylene glycol from racemic α-hydroxy-β,β-dimethyl-γ-butyrolactone, which comprises treating a mixture thereof with an aqueous alkali metal agent to convert the lactone to an alkali metal salt of α,γ-dihydroxy-β,β-dimethyl butyric acid, adding normal butanol to precipitate the butyric acid salt and removing said salt from the dimethyl propylene glycol.

5. A process of purifying α-hydroxy-β,β-dimethyl-γ-butyrolactone, which comprises adding an aqueous alkali metal alkaline agent to a crude racemic mixture of α-hydroxy-β,β-dimethyl-γ-butyrolactone containing dimethyl propylene glycol to convert the lactone to the alkali metal salt of α,γ-dihydroxy-β,β-dimethyl butyric acid, heating the mass, adding isopropanol and refluxing the mass, cooling the mass and separating the precipitated butyric acid salt from the dimethyl propylene glycol.

6. A process of purifying α-hydroxy-β,β-dimethyl-γ-butyrolactone, which comprises adding an aqueous alkali metal alkaline agent to a crude racemic mixture of α-hydroxy-β,β-dimethyl-γ-butyrolactone containing dimethyl propylene glycol to convert the lactone to the alkali metal salt of α,γ-dihydroxy-β,β-dimethyl butyric acid, heating the mass, adding isopropanol and refluxing the mass, cooling the mass, separating the precipitated butyric acid salt from the dimethyl propylene glycol and hydrolyzing the salt to form the corresponding lactone.

FRANK D. PICKEL.
LOUIS T. ROSENBERG.

REFERENCES CITED

The following references are of record in the file of this patent:

UNITED STATES PATENTS

| Number | Name | Date |
|---|---|---|
| 2,092,494 | Bass | Sept. 7, 1937 |
| 2,151,990 | Ruys | Mar. 28, 1939 |
| 2,194,665 | Mnookin | Mar. 26, 1940 |
| 2,271,872 | Mitchell | Feb. 3, 1942 |
| 2,319,545 | Harris et al. | May 18, 1943 |
| 2,328,000 | Finkelstein | Aug. 31, 1943 |

OTHER REFERENCES

Journal American Chem. Soc., July 1940.
Monatschefte fur Chemie, vol. 39.
Helvetica Chemica Acta, vol. 23, (1941).